United States Patent [19]
Welcker

[11] 3,835,832
[45] Sept. 17, 1974

[54] SELF-CLEANING BURNER COVER, ESPECIALLY FOR HOUSEHOLD APPLIANCES

[76] Inventor: Friedrich Welcker, (585) Hohenlimburg, Im Sonnenwinkel 28, Germany

[22] Filed: May 21, 1973

[21] Appl. No.: 362,537

[30] Foreign Application Priority Data
May 26, 1972 Germany............................ 2225530

[52] U.S. Cl. .................................. 126/215, 126/50
[51] Int. Cl. ........................................... F24c 15/14
[58] Field of Search ............... 126/215, 211, 50, 27

[56] References Cited
UNITED STATES PATENTS

| | | | |
|---|---|---|---|
| 1,572,168 | 2/1926 | Smith.................................. | 126/215 |
| 2,400,508 | 5/1946 | Hermann............................. | 126/215 |
| 2,478,614 | 8/1949 | Wilbur................................. | 126/215 |

*Primary Examiner*—Edward G. Favors
*Attorney, Agent, or Firm*—Wolfgang G. Fasse; Willard W. Roberts

[57] ABSTRACT

The present burner cover is provided on its top surface with a sheet metal cover layer which is either flanged or crimped around the edge of the cover or the cover has a recess in its top to receive the sheet metal layer, whereby the edge of the cover is preferably upset inwardly to hold the layer in position. The layer is made of a material having an expansion coefficient and heat conductivity larger than the cover itself, whereby an air space is formed between the cover layer during heating due to the bulging of the cover layer which will contract again when the burner is shut off to facilitate the removal of food spills.

8 Claims, 5 Drawing Figures

3,835,832

SELF-CLEANING BURNER COVER, ESPECIALLY FOR HOUSEHOLD APPLIANCES

BACKGROUND OF THE INVENTION

The present invention relates to a self-cleaning burner cover, especially for household appliances, for example, the burner of a gas range.

It has been suggested heretofore to provide electrically heated cooking plates made of cast iron with a protective coating of aluminum whereby said coating is positioned at least in the area which may be exposed to spilled over food. It has further been suggested to make the entire electrically heated cooking plate from an aluminum alloy. Difficulties have been encountered in this connection due to the low melting point of the aluminum and due to the fact that aluminum gives off little heat by radiation, because these characteristics of aluminum resulted in a destruction of the portions of the cooking plate made of aluminum due to over-heating. To avoid these difficulties it has been proposed to provide the protective aluminum coating which has been applied by spraying with an artificial oxide layer.

The above described proposals or suggestions have failed in their application in connection with gas burner covers which are mostly made of cast brass. On the one hand it is rather difficult to produce the gas burner cover entirely of aluminum because apparently automatic production methods do not permit the provision of the gas exist openings all around the burner cover body with the required precision unless rather costly steps are taken. On the other hand, the temperatures occurring in connection with the use of gas fuel are above the melting point of aluminum especially when the gas flame is adjusted to a low heating position or when the air supply is reduced. Such temperatures occur in the just mentioned circumstances in the immediate vacinity of the gas exit openings. As a result, even after short periods of use the protective coating is destroyed, whereby the destruction begins at the edges of the burner cover and proceeds to completely destroy the aluminum cover coating so that the resulting corrosive action diminishes the appearance of the burner cover.

OBJECTS OF THE INVENTION

In view of the above it is the aim of the invention to achieve the following objects singly or in combination:

to provide a burner cover, especially for gas burners with a surface which will clean itself of any spilled over and burned on food without the use of external cleaning aids;

to provide a burner cover with a protective layer in such a manner that the protective layer will have the necessary heat resistance or stability, while simultaneously facilitating its cleaning;

to arrange the cover sheet in such a manner relative to the cover body and to select the relative temperature expansion characteristics of the cover and the cover sheet so that the latter will be able to bulge and contract in response to temperature changes, whereby the movement of the cover sheet will cause any burned on food to flake off; and to provide the protective cover sheet with bulging facilitating means.

SUMMARY OF THE INVENTION

According to the invention there is provided a self-cleaning burner cover, especially for household appliances such as gas burners or the like, wherein the burner cover body is provided with a cover sheet having a larger temperature expansion coefficient and a larger heat conductivity than the burner cover body itself. The cover sheet is secured to the burner cover body along the edges of the cover sheet in such a manner that the center of the cover sheet may bulge outwardly in response to heat and contract back into its normal position when the burner is shut off.

The cover sheet may be either crimped around the radially outwardly flanging rim of the cover body or the latter may be provided with a shallow recess in its top surface so that the rim of the cover body will hold the cover sheet in a location fit. Preferably, in the last mentioned embodiment, the rim of the cover body may be upset inwardly to secure the cover sheet.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
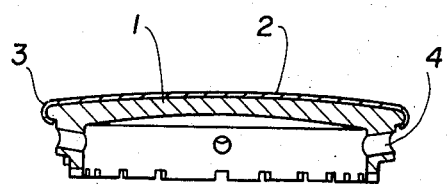
FIG. 1 shows a sectional view through a first embodiment providing a crimping connection between the burner cover body and the cover sheet.

Referring to FIG. 1, the burner cover body 1 may, for instance, be formed as a piece of cast iron or brass. The burner cover body 1 is provided with gas exit apertures 4 and with a radially outwardly extending flange around the top surface of the burner cover body 1. A cover sheet 2 made of a material having a larger temperature expansion coefficient and a larger heat conductivity than the burner cover body 1 is arranged in a form-fit on top of the body 1 whereby the mechanical connection between the body 1 and the cover sheet 2 is accomplished by a crimping 3, preferably extending all around the radial flange of the body 1. The cover sheet 2 is preferably made of aluminum.

If the gas flows out of the apertures 4 without the admixture of primary air, the gas will burn directly at the exit apertures 4 so that the burner cover 1 and the cover sheet 2 will be heated to about 700° C in the area of the crimping 3. Due to the high heat conductivity of the sheet 2, for example, of aluminum, the heat is instantaneously distributed over the entire sheet 2 so that a melting around the edges is prevented.

Figure 2:
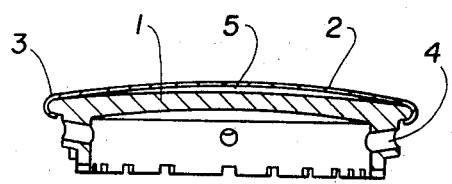
FIG. 2 is a sectional view similar to that of FIG. 1 except that the heated condition is illustrated in FIG. 2.

Simultaneously, the heating expands the sheet 2 whereby the heat expansion in cooperation with the mechanical stiffening provided by the crimping 3 causes an expansion of the material toward the center whereby the center of the sheet 2 bulges upwardly and lifts itself off the surface of the burner body 1 as illustrated in FIG. 2. In this manner, an air cushion 5 is provided between the surface of the body 1 and the cover sheet 2 which promotes a uniform and rapid heat distribution inside the cover sheet 2 while the crimping 3 strengthens the outer edge of the cover sheet 2 which facilitates the bulging in the center of the sheet.

It has been found that when the burner flame is adjusted to a low position, the resulting temperature is high enough to decompose any spilled food on top of the cover sheet 2 in cooperation with the oxygen of the air. When the burner is shut off, the cover sheet 2 will contract back into its normal position and this movement will cause the pyrolyticly decomposed food spills to flake off the surface of the cover sheet 2 whereby the food spills may be easily removed and the burner cover retains its neat appearance during a long service life.

Figure 3:
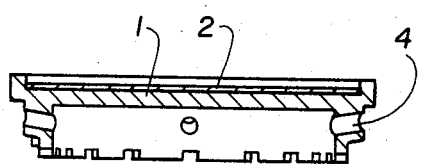
FIG. 3 illustrates also in a sectional view another embodiment wherein the cover sheet is located in a shallow recess in the top surface of the burner cover body.

In the embodiment illustrated in FIG. 3, the burner cover body 1' may for example be formed in a die shaping step, for example from brass or the like. A shallow recess is provided in the top surface of the body 1' to locate a cover sheet 2' in a location fit between the circumferential edge of the cover sheet 2' and the upwardly extending rim 3' of the body 1'. If desired, the upwardly extending rim 3' of the body 1' may be slightly upset inwardly to firmly secure the circumferential edge of the cover sheet 2' as shown in FIG. 4 which illustrates the unit in the heated condition whereby an air cushion 5 is formed between the body 1' and the sheet 2' in the same manner as in FIG. 2.

Figure 4:
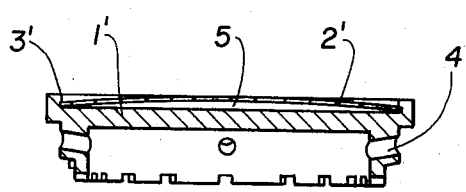
FIG. 4 is a view similar to that of FIG. 3, but illustrating the embodiment of FIG. 3 in its heated condition.

The operation of the embodiment according to FIGS. 3 and 4 is substantially the same as that described above in connection with FIGS. 1 and 2. Thus, when the gas flowing out of the apertures 4 burns directly at the outside ends of these apertures, the body 1' and the cover sheet 2' are heated in the area of the upset rim 3' to about 700° C. However, due to the high heat conductivity of the sheet 2' which may be made of aluminum, the heat is instantaneously distributed throughout the entire sheet 2' whereby the resulting heat expansion causes the mentioned bulging upwardly with the same effect as described above.

Figure 5:
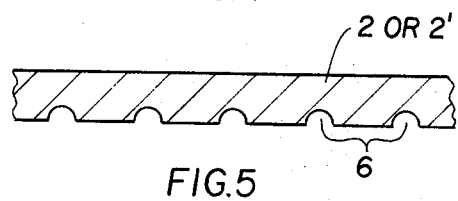
FIG. 5 illustrates on an enlarged scale a partial sectional view through the cover sheet to illustrate the formation of grooves or the like in its lower surface.

FIG. 5 illustrates on an enlarged scale a section through the cover sheet 2 or 2' to illustrate the grooves or notches 6 which may be provided in the surface of the cover sheet facing the top surface of the body 1 or 1'. These grooves 6 facilitate the upward bulging described above and may be arranged in any desirable shape, for example, in square shapes or in diamond shapes.

In both embodiments according to the invention, any spilled food on the surface of the cover sheet 2 or 2' is pyrolyticly decomposed by the cooperation of the air oxygen and the heated cover sheet whereby the bulging facilitates the flaking off of the decomposed food spills. In this connection it has been found, that the cleaning is best accomplished when the flame of the burner is adjusted to a low position and the burner itself is not used for any cooking purpose in this instance the flame lights up visibly indicating a temperature range of about 400° to 500° C.

It is also desirable to provide the surface of the cover sheet 2 or 2' facing away from the surface of the body of the burner cover with a polished or glossy finish whereby the effective heat radiation is kept small which contributes to the self-cleaning effect.

Although the invention has been described with reference to specific example embodiments, it is to be understood that it is intended to cover all modifications and equivalents within the scope of the appended claims.

What is claimed is:

1. A burner cover, especially for household appliances, comprising a burner cover body made of a metal having a given temperature expansion coefficient, a cover sheet on said burner cover body made of a metal having a larger temperature expansion coefficient than said first mentioned coefficient and also a larger heat conductivity than said burner cover body, said cover sheet further having a central portion and a circumferential edge portion, and means for rigidly securing said circumferential edge portion of the cover sheet to the burner cover body to substantially prevent relative movement between the burner cover body and the circumferential edge portion of the cover sheet, whereby the cover sheet bulges upwardly with its central portion in response to heat and flattens out again when the burner is shut off.

2. The burner cover according to claim 1, wherein said burner cover body is made of cast iron and the cover sheet is made of aluminum.

3. The burner cover according to claim 1, wherein said burner cover body is made of brass and the cover sheet is made of aluminum.

4. The burner cover according to claim 1, wherein said means for rigidly securing said cover sheet to the burner cover body comprise a radially outwardly extending flange rim around said burner cover body, said cover sheet having an outer rim crimped around said flange rim of said burner cover body.

5. The burner cover according to claim 1, wherein said burner cover body has a top surface, said means for rigidly securing said cover sheet to said burner cover body comprising a relatively flat recess in said top surface and an upwardly extending rim surrounding said recess for providing a rigid location fit of said cover sheet in said recess.

6. The burner cover according to claim 5, wherein said upwardly extending rim is slightly upset inwardly for holding the cover sheet in place.

7. The burner cover according to claim 1, wherein said cover sheet is provided with grooves or recesses in one side thereof, said grooves or recesses facing said burner cover body.

8. The burner cover according to claim 1, wherein said cover sheet has a polished surface facing away from said burner cover body.

* * * * *